United States Patent
Wang et al.

(10) Patent No.: US 11,971,358 B2
(45) Date of Patent: Apr. 30, 2024

(54) SAMPLE ROTATING RACK AND RAMAN SPECTRUM DETECTOR

(71) Applicant: ACADEMY OF MILITARY MEDICAL SCIENCES, Beijing (CN)

(72) Inventors: Shengqi Wang, Beijing (CN); Rui Xiao, Beijing (CN); Zhen Rong, Beijing (CN)

( * ) Notice: Subject to any disclaimer, the term of this patent is extended or adjusted under 35 U.S.C. 154(b) by 102 days.

(21) Appl. No.: 17/614,007

(22) PCT Filed: Aug. 14, 2019

(86) PCT No.: PCT/CN2019/100642
§ 371 (c)(1),
(2) Date: Nov. 24, 2021

(87) PCT Pub. No.: WO2020/237840
PCT Pub. Date: Dec. 3, 2020

(65) Prior Publication Data
US 2022/0221406 A1 Jul. 14, 2022

(30) Foreign Application Priority Data
May 27, 2019 (CN) .......................... 201910447999.7

(51) Int. Cl.
*G01N 21/65* (2006.01)
*G01N 21/01* (2006.01)

(52) U.S. Cl.
CPC ............. *G01N 21/65* (2013.01); *G01N 21/01* (2013.01); *G01N 2201/021* (2013.01); *G01N 2201/06113* (2013.01)

(58) Field of Classification Search
CPC .. G01N 21/65; G01N 21/01; G01N 2201/021; G01N 2201/06113;
(Continued)

(56) References Cited

U.S. PATENT DOCUMENTS 10,677,953 B2 * 6/2020 Stetson ................. G01V 3/101
2003/0104486 A1 6/2003 Selvan
(Continued)

FOREIGN PATENT DOCUMENTS

CN 103149191 A 6/2013
CN 103454230 A * 12/2013
(Continued)

OTHER PUBLICATIONS

International Search Report, PCT/CN2019/100642, Translation, Date of the actual completion of the International Search Feb. 12, 2021.
(Continued)

*Primary Examiner* — Mohamed K Amara
(74) *Attorney, Agent, or Firm* — Flener IP & Business Law; Zareefa B. Flener (57) ABSTRACT

A sample rotating rack and a Raman spectrum detector are provided. The sample rotating rack comprises a rotating body and a plurality of sample carriers provided thereon, distributed around the circumference of the rotating body and able to be irradiated by light rays at the periphery of the rotating body. The Raman spectrum detector comprises a laser, a spectrum analyzer, a Raman probe, a rotating table and a sample rotating rack; the sample rotating rack is arranged on the rotating table, the Raman probe is arranged at the periphery of the sample rotating rack, and the Raman probe is electrically connected to the laser and the spectrum analyzer respectively; and the laser is used for emitting excitation light by means of the Raman probe, and the Raman probe can receive Raman scattered light and return same to the spectrum analyzer.

20 Claims, 11 Drawing Sheets

(58) Field of Classification Search
CPC ............... G01N 35/04; G01N 21/253; G01N 2035/0441; G01N 33/558; G01J 3/0291; G01J 3/44
See application file for complete search history.

(56) References Cited

U.S. PATENT DOCUMENTS

| | | | |
|---|---|---|---|
| 2004/0184214 A1* | 9/2004 | Vicci ..................... | G01Q 60/50 361/173 |
| 2006/0238765 A1 | 10/2006 | Shah et al. | |
| 2006/0263896 A1* | 11/2006 | Hollebone ........... | G01N 21/645 436/165 |
| 2007/0194225 A1* | 8/2007 | Zorn ..................... | G01Q 30/10 250/306 |
| 2010/0267049 A1* | 10/2010 | Rutter .............. | G01N 33/54388 435/7.1 |
| 2012/0286702 A1* | 11/2012 | Bazaz ..................... | H05H 7/04 315/501 |
| 2013/0230913 A1* | 9/2013 | Florescu ................ | G01N 21/17 422/69 |
| 2017/0242194 A1* | 8/2017 | Lin ....................... | G01N 21/552 |
| 2018/0088141 A1* | 3/2018 | Vacic ................. | G01N 35/00029 |
| 2019/0046394 A1* | 2/2019 | Lurie ................... | A61G 13/122 |

FOREIGN PATENT DOCUMENTS

| | | | | |
|---|---|---|---|---|
| CN | 103454230 | A | | 12/2013 |
| CN | 203786038 | U | | 8/2014 |
| CN | 104076023 | A | | 10/2014 |
| CN | 104089943 | A | | 10/2014 |
| CN | 104237199 | A | | 12/2014 |
| CN | 105004673 | A | * | 10/2015 |
| CN | 105004673 | A | | 10/2015 |
| CN | 105259358 | A | * | 1/2016 |
| CN | 105259358 | A | | 1/2016 |
| CN | 106770078 | A | | 5/2017 |
| CN | 107548453 | A | | 1/2018 |
| CN | 108499631 | A | | 9/2018 |
| CN | 108680759 | A | | 10/2018 |
| CN | 108680759 | A | * | 10/2018 ............. G01N 35/00 |
| CN | 108801150 | A | | 11/2018 |
| CN | 108896778 | A | | 11/2018 |
| CN | 208607236 | U | | 3/2019 |
| CN | 110057808 | A | | 7/2019 |

OTHER PUBLICATIONS

The State Intellectual Property Office of People's Republic of China, Application No. 201910447999.7, First Office Action, dated May 12, 2019.
The State Intellectual Property Office of People's Republic of China. Application No. 201910447999.7, The Second Office Action, Applicant filed statement on application Mar. 20, 2020.
Studies on the Raman Spectrum of Filter Paper, Ouyang Yu, Feng Shang-cai, Li Bao-hui, The Journal of Light Scattering, vol. 24 No. 1, Mar. 2012.
Research progress in SERS-based lateral flow immunochromatography, Jia Xiao f-ei1, 2, Xiao Rui2*, Wang Sheng-qi1, 2* vol. 42, No. 4, Apr. 2018.
The State Intellectual Property Office of People's Republic of China, Application No. 201910447999.7, Third Office Action, dated May 20, 2020.
Written Opinion of the International Searching Authority, PCT/CN2019/100642, dated Feb. 21, 2020.

* cited by examiner

SAMPLE ROTATING RACK AND RAMAN SPECTRUM DETECTOR

CROSS-REFERENCE TO RELATED APPLICATIONS

The present application claims priority to Chinese Patent Application No. 2019104479997, entitled "Sample Rotating Rack and Raman Spectrum Detector", filed with Chinese Patent Office on May 27, 2019, the entire content of which is incorporated herein by reference.

TECHNICAL FIELD

The present application relates to the field of biological science research and application technologies, and particularly to a sample rotating rack and a Raman spectrum detector.

BACKGROUND ART

Raman scattering, also known as a Raman effect, refers to scattering in which a frequency of incident light changes due to an interaction with a motion of molecules of a medium, and the change in the frequency of the incident light results from a change in molecular polarizability (a change in an electron cloud).

A difference between frequencies of scattered light and the incident light is called a Raman shift which is independent of the frequency of the incident light and only dependent on a structure of a scattering molecule itself. The Raman shift depends on a variation in a molecular vibrational level, and the molecular vibrational levels serving as inherent features of different chemical bonds or groups have different variations, and therefore, corresponding Raman shifts are also different. Therefore, a Raman spectrum may serve as a basis for a qualitative analysis of a molecular structure. A Raman spectrometer is mainly used to determine and confirm material compositions, and may also be used in criminal investigation and jewelry industries, such as a test of drugs and identification of precious stone.

However, the existing Raman spectrometer has complex operations and low test efficiency.

SUMMARY

An object of the present application is to provide a sample rotating rack and a Raman spectrum detector, so as to improve problems that a Raman spectrometer in the prior art has complex operations, low test efficiency, or the like.

The present application is implemented by the following technical solution.

In a first aspect, the present application provides a sample rotating rack, including a rotating body and a plurality of sample carriers provided thereon, the plurality of sample carriers being distributed around a circumference of the rotating body and being able to be irradiated by light rays located at a periphery of the rotating body.

On the basis of the above-mentioned technical solution, further, the sample carriers are each a ring sleeve, and the plurality of ring sleeves are arranged around the circumference of the rotating body and configured to allow test tubes to be inserted therein to fix the test tubes.

The technical solution has a technical effect that the test tube may be directly loaded with a solution sample, and since the test tube has a transparent tube wall, the sample is directly irradiated by a laser conveniently. In order to fixedly place the test tube, the ring sleeve, a bayonet mount or a clamping assembly may be provided on the circumference of the rotating body. Here, the test tube may be fixed by either the bayonet mount or the clamping assembly, but since the test tube is circumferentially rotated during an experiment, the sample carrier is preferably designed as a ring sleeve structure, which facilitates fixation of the test tube. Further, since the test tube is placed on the ring sleeve, a magnetic component may be provided at a position of the rotating body corresponding to a bottom end of any test tube, or a magnetic ring may be provided on the circumference of the rotating body, thus facilitating attraction of magnetic solute in the test tube.

Further, the rotating body is cylindrical, the sample carrier is a tube cavity provided in a side wall of the rotating body, and the plural sample carriers are arranged around the circumference of the rotating body; a length direction of the tube cavity is parallel to an axial direction of the rotating body; a side wall of each tube cavity apart from an axle center of the rotating body is provided with an observation window; and the plurality of tube cavities communicate with each other, at bottom.

The technical solution has a technical effect that the tube cavity is configured to bear an immunochromatographic test paper strip, and incident light rays and scattered light rays respectively irradiate the observation window and return. When the plurality of tube cavities are in communication with each other through the bottoms, the test paper strips in the plurality of tube cavities are used for testing a plurality of biological indexes of the same sample. Different index features of the same sample may be tested during rotation of the rotating body. Due to communication of the plurality of tube cavities at bottom, a unified solution sample injection port is provided in an upper end at a middle axis position of the rotating body.

Further, the tube cavity extends from an end surface of one end of the rotating body to the other end of the rotating body.

Further, the rotating body is provided with an injection passage in communication with each tube cavity, and the injection passage has an injection port in an end surface of the rotating body.

Further, the injection passage is located at a middle axis line of the rotating body and extends along the middle axis line of the rotating body.

Optionally, the rotating body is cylindrical, the sample carrier is a tube cavity provided in a side wall of the rotating body, and the plural sample carriers are arranged around the circumference of the rotating body; a length direction of the tube cavity is parallel to an axial direction of the rotating body; a side wall of each tube cavity apart from an axle center of the rotating body is provided with an observation window; and all the tube cavities are not in communication with each other.

The technical solution has a technical effect that the tube cavity is configured to bear an immunochromatographic test paper strip, and incident light rays and scattered light rays respectively irradiate the observation window and return. When the tube cavities are independent from and not in communication with each other, the test paper strip in any tube cavity is used for testing one independent sample. Features of a plurality of samples may be tested simultaneously during rotation of the rotating body.

On the basis of the above-mentioned technical solution, further, side walls of individual tube cavities are each provided with a filling port communicated with the corresponding tube cavity.

The technical solution has a technical effect that since different solution samples are tested respectively, which requires plural filling operations, the filling port is independently provided in the side wall of each tube cavity, and the solution sample to be tested is placed therein from an outer edge of the tube cavity.

Further, an outer side wall of the tube cavity is provided with a filling structure, the filling structure is convexly disposed on the outer side wall of the tube cavity, the filling structure is internally provided with a passage communicated with the tube cavity 3, and the filling port is provided in the filling structure and communicated with the passage of the filling structure.

Further, the filling port is arranged as facing towards the axial direction of the rotating body.

On the basis of any one of the above-mentioned technical solutions, further, the plurality of sample carriers are evenly distributed around the circumference of the rotating body.

The technical solution has a technical effect that since the sample carriers are evenly distributed, location is more accurate when the rotating body is driven to rotate. Test paper in the next tube cavity may be irradiated every time the rotating body is rotated by a specific angle.

In a second aspect, the present application further provides a Raman spectrum detector, including a laser, a spectrum analyzer, a Raman probe, a rotating table and the above-mentioned sample rotating rack, the sample rotating rack being arranged on the rotating table, the Raman probe being arranged at a periphery of the sample rotating rack, and the Raman probe being electrically connected to the laser and the spectrum analyzer respectively; and the laser being configured to emit excitation light to the sample rotating rack by means of the Raman probe, and the Raman probe being able to receive Raman scattered light of the sample rotating rack and return the Raman scattered light to the spectrum analyzer.

On the basis of the above-mentioned technical solution, further, a two-dimensional manual translation table may be provided below the sample rotating rack, such that the sample rotating rack may be integrally and detachably mounted on the rotating table. The two-dimensional manual translation table has translation and lifting functions at the same time. The sample rotating rack may be moved up and down by manually adjusting the two-dimensional translation table up and down, such that incident light rays emitted by the Raman probe may be switched between a test line (T line) and a control line (C line) of the sample rotating rack. Similarly, the sample rotating rack may be moved back and forth by manually adjusting a knob of the two-dimensional translation table back and forth.

On the basis of the above-mentioned technical solution, a reset device is further provided, the reset device being provided on the rotating table.

The technical solution has a technical effect that the reset device may set that each test process starts with one particular tube cavity, which is particularly useful when not all tube cavities are used, saves time and improves test efficiency.

On the basis of any one of the above-mentioned technical solutions, further, a lifting mechanism is further included, the sample rotating rack being provided on the rotating table by means of the lifting mechanism.

The technical solution has a technical effect that the incident light rays emitted by the Raman probe are switched between the test line (T line) and the control line (C line) of the sample rotating rack, by adjusting the lifting mechanism up and down.

Further, the lifting mechanism includes a cylinder or a linear motor.

On the basis of any one of the above-mentioned technical solutions, further, a translation mechanism is further included, the sample rotating rack being provided on the rotating table by means of the translation mechanism, and the translation mechanism being able to change a distance between the sample rotating rack and the Raman probe.

The technical solution has a technical effect that a laser focal length of the incident light rays emitted by the Raman probe onto the sample rotating rack may be adjusted by adjusting the translation mechanism to change the distance between the sample rotating rack and the Raman probe.

Further, the translation mechanism includes a cylinder or a linear motor.

Optionally, the lifting mechanism and the translation mechanism may be combined to be as a set of device to perform unified control on a spatial position of the sample rotating rack.

Optionally, a display screen electrically connected to the spectrum analyzer may be further provided to output an analysis result of the spectrum analyzer by means of a chart, such that an experimenter may conveniently and directly read all reaction data of a sample solution.

Optionally, a rechargeable battery electrically connected to the laser and the spectrum analyzer may be further provided. The rechargeable battery may prevent experimental failure caused by a sudden power interruption, and the rechargeable battery plays an important role in facilitating use of an apparatus in an environment where a power source is not easily connected.

The sample rotating rack and the Raman spectrum detector according to the present application at least have following beneficial effects.

The sample rotating rack according to the present application includes the rotating body and the plurality of sample carriers provided thereon, and the plurality of sample carriers are distributed around the circumference of the rotating body. Therefore, as many as sample carriers may be arranged in a space as small as possible, and optical irradiation may be quickly conducted on a plurality of samples by rotating the rotating body, thus simplifying operations and improving the test efficiency in a test of the plurality of samples.

The Raman spectrum detector according to the present application includes the laser, the spectrum analyzer, the rotating table and the above-mentioned sample rotating rack, such that optical analysis and test may be quickly conducted on the plurality of samples, resulting in simple and convenient operations and the high test efficiency.

Additional technical features of the present application and advantages thereof will be more clearly set forth in the description which follows, or may be learned by the concrete practice of the present application.

BRIEF DESCRIPTION OF DRAWINGS

To describe the technical solutions in the embodiments of the present application more clearly, the following briefly describes the accompanying drawings required for describing the embodiments. Apparently, the accompanying drawings in the following description show merely some embodiments of the present application, and a person of ordinary skill in the art may still derive other drawings from these accompanying drawings without creative efforts.

Reference numerals: 1—rotating body; 2—ring sleeve; 3—tube cavity; 4—observation window; 5—filling port; 6—laser; 7—spectrum analyzer; 8—rotating table; 9—reset device; 10—Raman probe; 11—stepping motor; 12—two-dimensional manual translation table.

DETAILED DESCRIPTION

The technical solutions of the present application are clearly and completely described below with reference to the accompanying drawings, and apparently, the described embodiments are not all but a part of the embodiments of the present application. All other embodiments obtained by a person of ordinary skill in the art based on the embodiments of the present application without creative efforts shall fall within the protection scope of the present application.

In descriptions of the present application, it should be noted that, directions or positional relationships indicated by terms "upper", "lower", "outer" etc. are based on orientations or positional relationships shown in the accompanying drawings, and they are used only for describing the present application and for description simplicity, but do not indicate or imply that an indicated device or element must have a specific orientation or be constructed and operated in a specific orientation. Therefore, it cannot be understood as a limitation on the present application. In addition, the terms such as "first" and "second" are only used for purposes of description and are not intended to indicate or imply importance in relativity.

In the description of the present application, it should be noted that unless clearly specified or limited otherwise, the terms "mount" and "connect" shall be understood broadly, and it may be, for example, fixed connection, detachable connection, or integral connection; may be direct connection or indirect connection via an intermediate medium; may also be internal communication between two elements. The specific meanings of above terms in the present application can be understood by those skilled in the art according to specific situations.

In the prior art, material compositions may be determined by a Raman spectrum detector which confirms the material compositions by testing a Raman shift. The existing Raman spectrum detector has a large size/volume, a complex structure, a high price and numerous operation steps, multi-index multi-times test of a single sample and a unified test of plural samples are unable to be performed at a time, and operations are complex and tedious, resulting in a low test efficiency.

In order to improve the above-mentioned problems, the present application provides a sample rotating rack and a Raman spectrum detector having the sample rotating rack mounted thereon. To facilitate an understanding of the sample rotating rack according to the present application and a use environment thereof, the Raman spectrum detector is first described as a whole.

Figure 1:
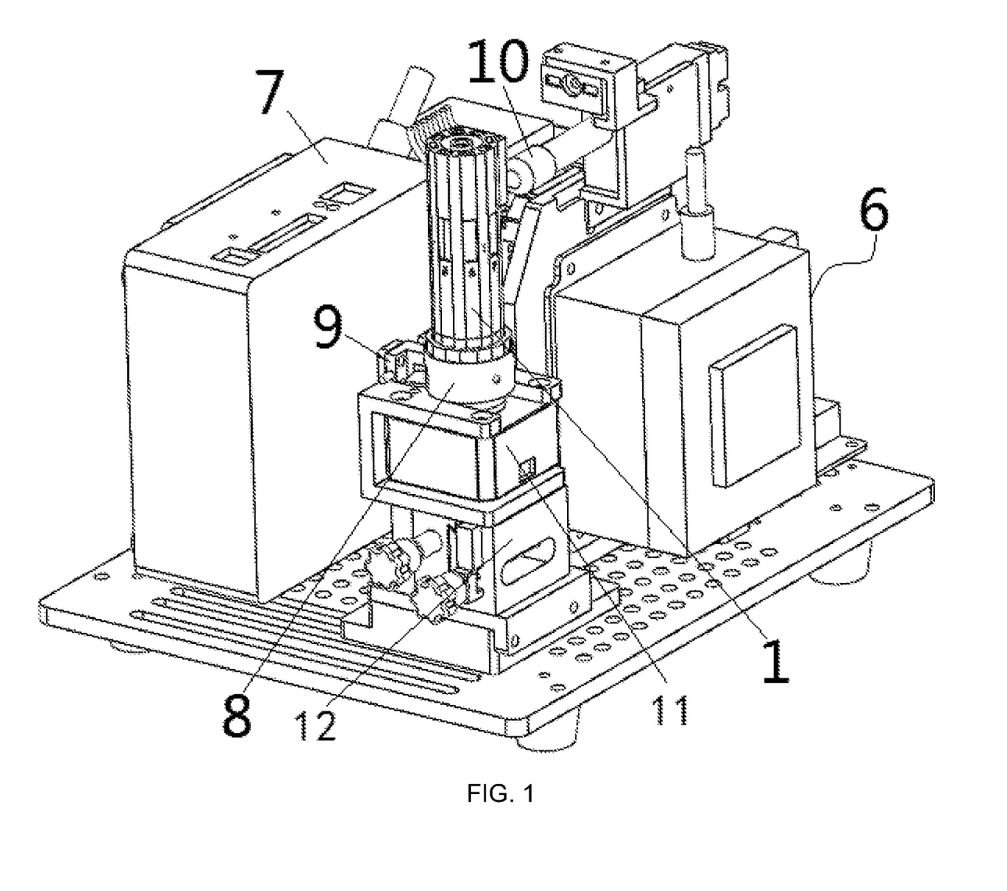
FIG. 1 is a schematic structural diagram of a Raman spectrum detector according to an embodiment of the present application, from a first viewing angle.
Figure 2:
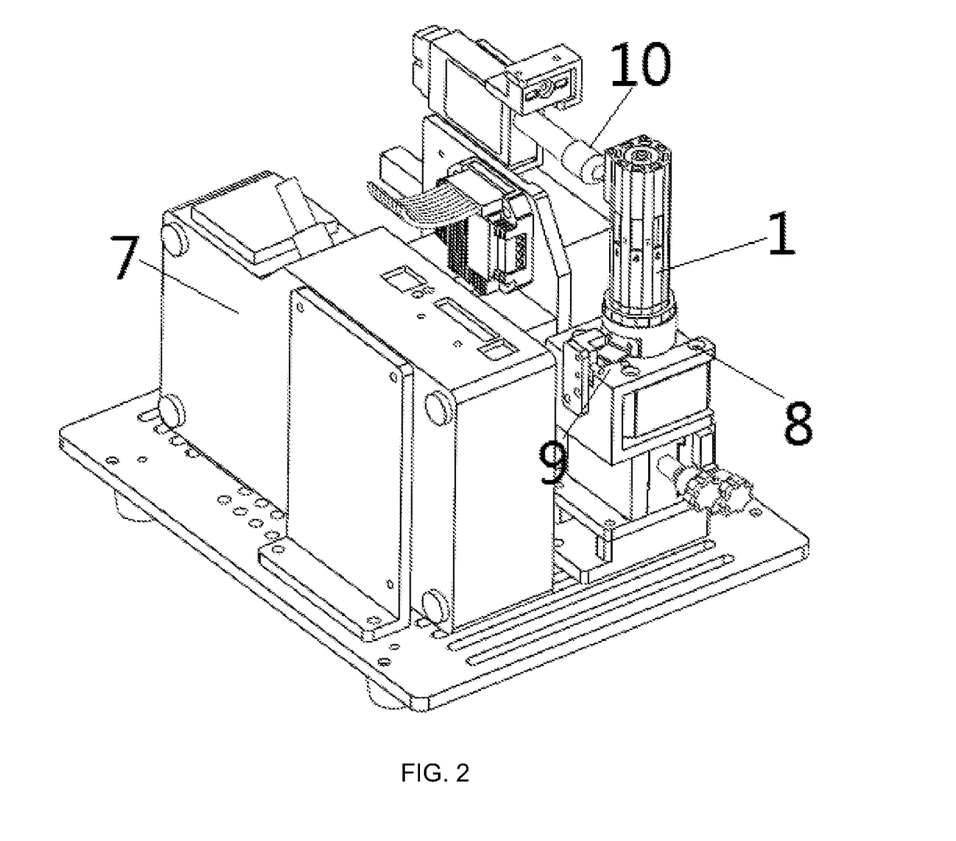
FIG. 2 is a schematic structural diagram of the Raman spectrum detector according to the embodiment of the present application, from a second viewing angle.

FIG. 1 is a schematic structural diagram of a Raman spectrum detector according to an embodiment of the present application from a first viewing angle; and FIG. 2 is a schematic structural diagram of the Raman spectrum detector according to the embodiment of the present application from a second viewing angle. As shown in FIGS. 1 and 2, the Raman spectrum detector according to the present application includes a laser 6, a spectrum analyzer 7, a Raman probe 10, a rotating table 8, and the sample rotating rack according to the present application. The sample rotating rack is provided on the rotating table 8, and the rotating table 8 may be driven by a stepping motor 11 to drive the sample rotating rack to rotate. The Raman probe 10 is provided at a periphery of the sample rotating rack and radially spaced apart from the sample rotating rack. The Raman probe 10 is electrically connected to the laser 6 and the spectrum analyzer 7 respectively. The laser 6 may emit excitation light to the sample rotating rack by means of the Raman probe 10, causing test paper of the sample rotating rack to generate Raman scattered light which is collected by the Raman probe 10 and sent to the spectrum analyzer 7. In use of the Raman spectrum detector, a plurality of samples may be simultaneously carried on the sample rotating rack, and the samples on the sample rotating rack may be successively irradiated by the excitation light by driving the rotating table, so as to generate scattering. In this way, the plural samples may be tested efficiently, which avoids manually sample loading, unloading and moving every time one sample is tested, thus improving the test efficiency of the plural samples.

The sample rotating rack according to the embodiment of the present application will be described in detail below.

Figure 3:
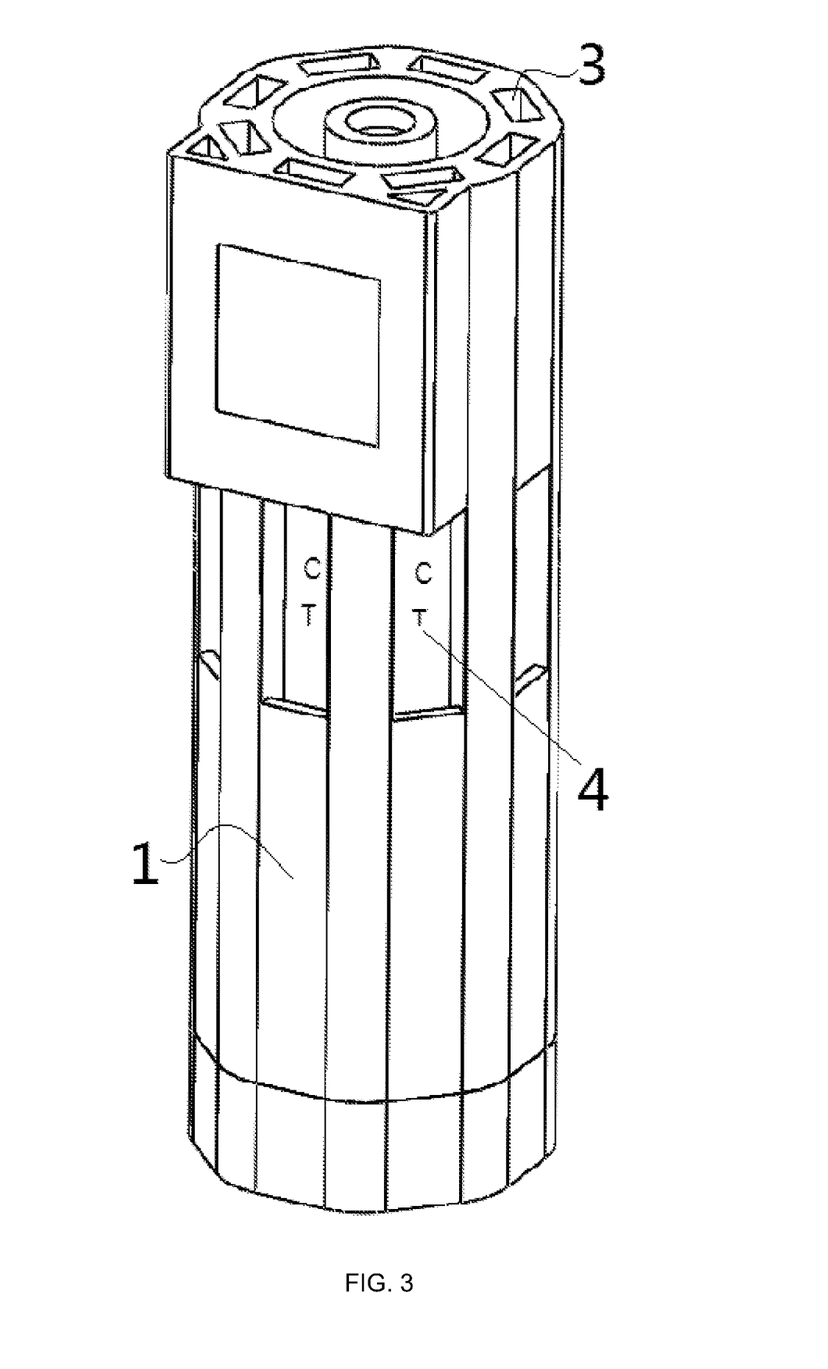
FIG. 3 is a perspective view of a sample rotating rack according to an embodiment of the present application.
Figure 4:
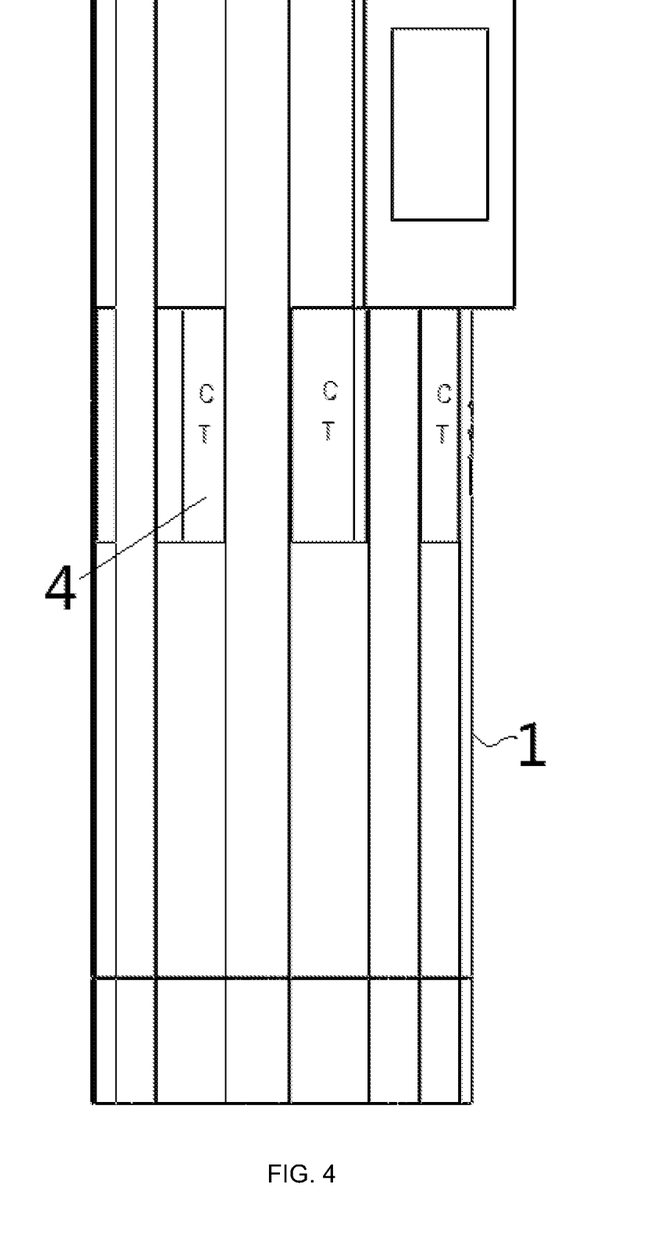
FIG. 4 is a front view of the sample rotating rack according to the embodiment of the present application.
Figure 5:
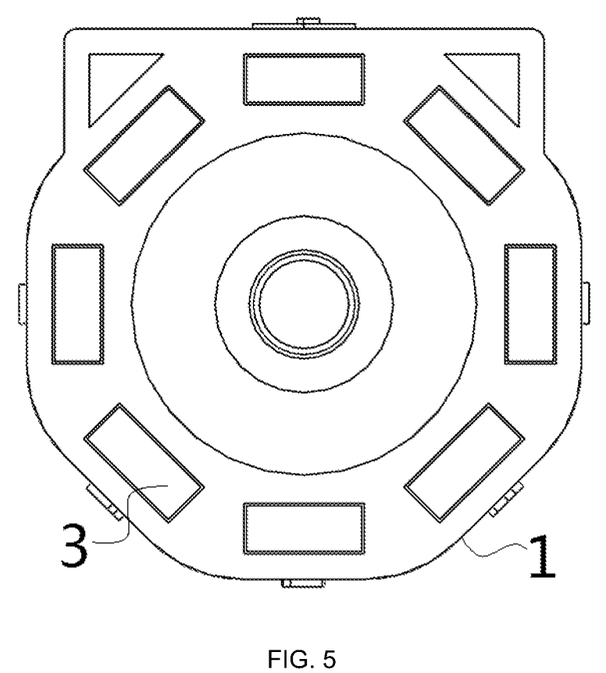
FIG. 5 is a top view of the sample rotating rack according to the embodiment of the present application.

FIG. 3 is a perspective view of a sample rotating rack according to one embodiment of the present application; FIG. 4 is a front view of the sample rotating rack according to the embodiment of the present application; and FIG. 5 is a top view of the sample rotating rack according to the embodiment of the present application. Referring to FIGS. 3 to 5, the sample rotating rack according to the present application includes a rotating body 1 and a plurality of sample carriers provided thereon, the plurality of sample carriers being distributed around a circumference of the rotating body 1 and being able to be irradiated by light rays located at a periphery of the rotating body 1. When the sample rotating rack is applied to the Raman spectrum detector according to the present application, the sample carrier may receive the excitation light emitted by the laser 6 by means of the Raman probe 10 to the sample rotating rack.

As shown in FIGS. 3 to 5, the rotating body 1 is cylindrical and has one end configured to be connected to the rotating table 8 of the Raman spectrum detector, and an axis of the rotating body 1 is coincident with a rotation axis of the rotating table 8 when the rotating body is mounted on the Raman spectrum detector. In the present embodiment, the sample carrier is a tube cavity 3 provided in a side wall of the rotating body 1, and the plurality of sample carriers are provided around the circumference of the rotating body 1. Referring to FIG. 1, in the present embodiment, the tube cavity 3 extends from an end surface (i.e., the upper end surface in FIG. 3) of the rotating body 1 apart from the rotating table 8 to an end (i.e., the lower end in FIG. 3) close to the rotating table 8, and a length direction of the tube cavity 3 is parallel to an axial direction of the rotating body 1. The side wall of each tube cavity 3 apart from an axis of the rotating body 1 is provided with an observation window 4, and in the structure, the tube cavity 3 is configured to bear an immunochromatographic test paper strip, and the observation window 4 is configured to expose a test line (T line) and a control line (C line) of the immunochromatographic test paper strip. Light of the laser 6 is successively radiated on the T line or the C line by means of the Raman probe 10, such that biomolecules on the T line or the C line are excited to generate a Raman signal, and the generated Raman signal is returned by means of the Raman probe 10. Optionally, the plurality of tube cavities 3 communicate with each other at bottom, and when the plurality of tube cavities 3 communicate with each other through the bottoms thereof, the test paper strips in the plurality of tube cavities 3 are used for testing a plurality of biological indexes of the same sample. Different index features of the same sample may be tested during rotation of the rotating body 1. In the structure, due to communication of the plurality of tube cavities 3 at bottom, a unified solution sample injection port is provided in an upper end at a middle axis position of the rotating body 1, the injection port is communicated with an injection passage located at the middle axis position of the rotating body 1, and the injection passage is communicated with the bottom of each tube cavity 3. The solution sample may be injected into all the tube cavities 3 simultaneously by designing the injection passage and the injection port. It should be appreciated that in other optional embodiments of the present application, the plurality of tube cavities 3 may not be in communication with each other at bottom, in which case the tube cavities 3 may be configured to simultaneously contain different samples, such that different samples may be tested successively.

Since the sample carriers are provided around the circumference of the rotating body 1, the sample to be tested is selected by rotation, and this structure is also conducive to saving occupied space.

Figure 6:
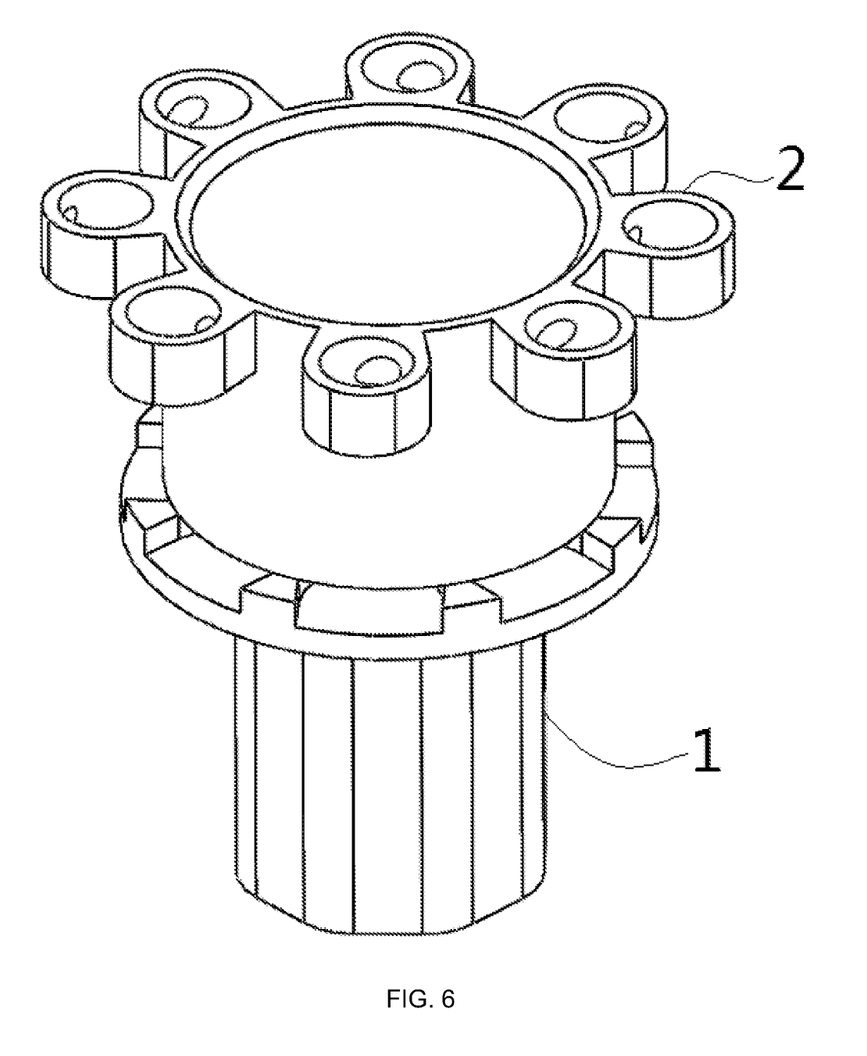
FIG. 6 is a perspective view of a sample rotating rack according to another embodiment of the present application.
Figure 7:
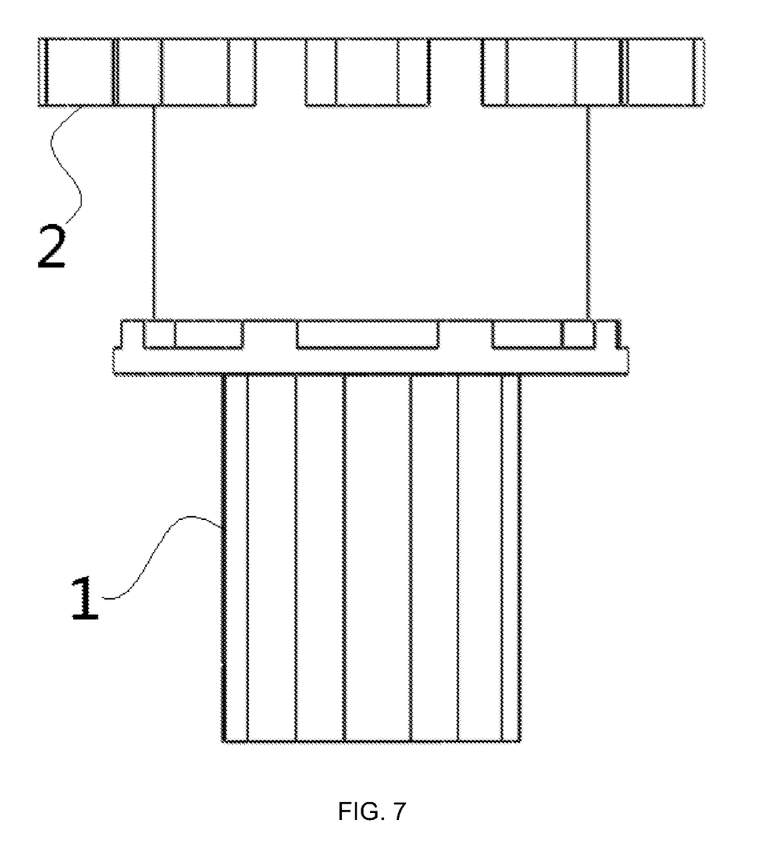
FIG. 7 is a front view of the sample rotating rack according to the another embodiment of the present application.
Figure 8:
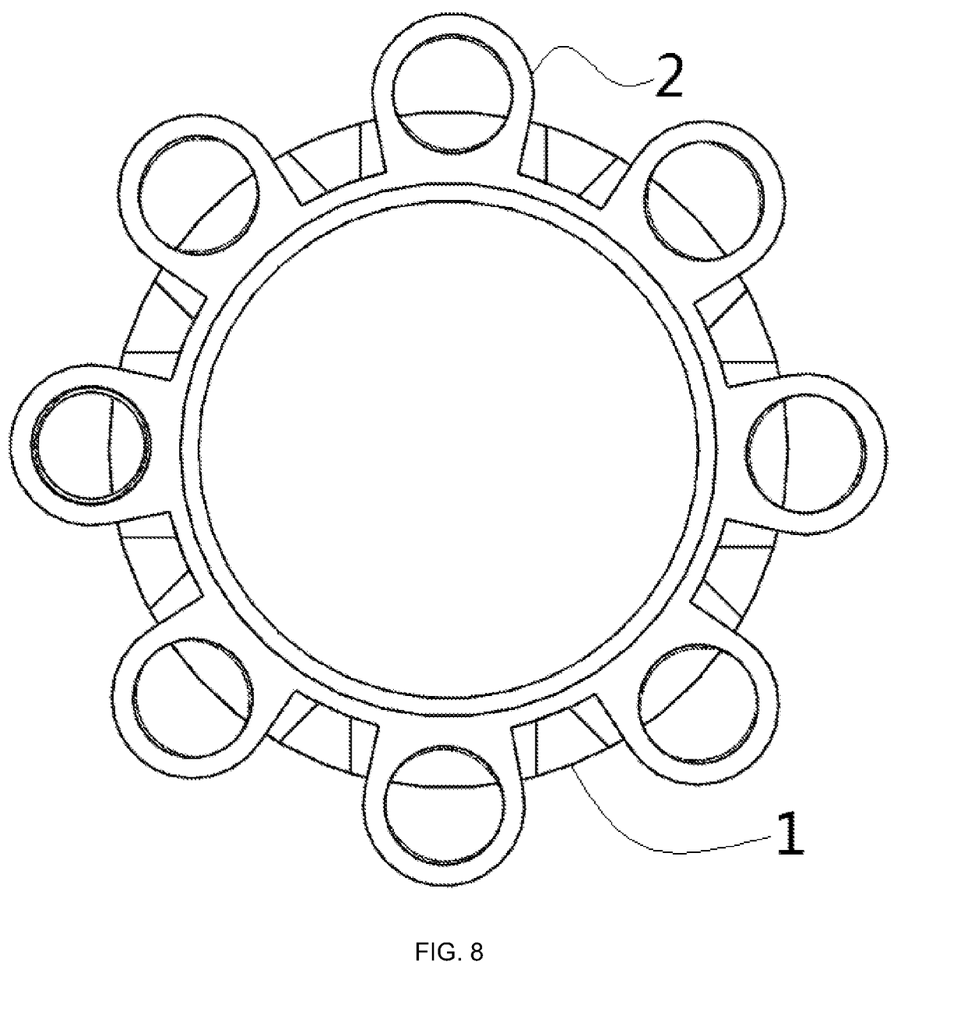
FIG. 8 is a top view of the sample rotating rack according to the another embodiment of the present application.

FIG. 6 is a perspective view of a sample rotating rack according to another embodiment of the present application; FIG. 7 is a front view of the sample rotating rack according to the another embodiment of the present application; and FIG. 8 is a top view of the sample rotating rack according to the another embodiment of the present application. As shown in FIGS. 6 to 8, in another optional embodiment of the present application, the sample carriers distributed around the circumference of the rotating body 1 are ring sleeves 2, the plurality of ring sleeves 2 are uniformly provided and spaced apart around the axis of the rotating body 1, and the ring sleeve 2 is configured to allow a test tube to be inserted therein to fix the test tube (not shown in the drawings). In the structure, the solution sample is loaded by the test tube fixed by the ring sleeve 2, and since the test tube has a transparent tube wall, the sample is conveniently irradiated directly by the laser 6. Certainly, in order to fixedly place the test tube, the test tube may be fixed by a bayonet mount or a clamping assembly in addition to the ring sleeve 2 provided around the circumference of the rotating body 1. The test tube may be fixed by either the bayonet mount or the clamping assembly, but since the test tube may be circumferentially rotated during an experiment and has a certain centrifugal force in the motion process, a centrifugal deviation of the test tube may be better prevented by fixing the test tube using the ring sleeve 2 structure. Further, since the test tube is placed on the ring sleeve 2, a magnetic component may be provided at a position of the rotating body 1 corresponding to a bottom end of any test tube, or a magnetic ring may be provided on the circumference of the rotating body 1, thus facilitating attraction of magnetic solute in the test tube.

Figure 9:
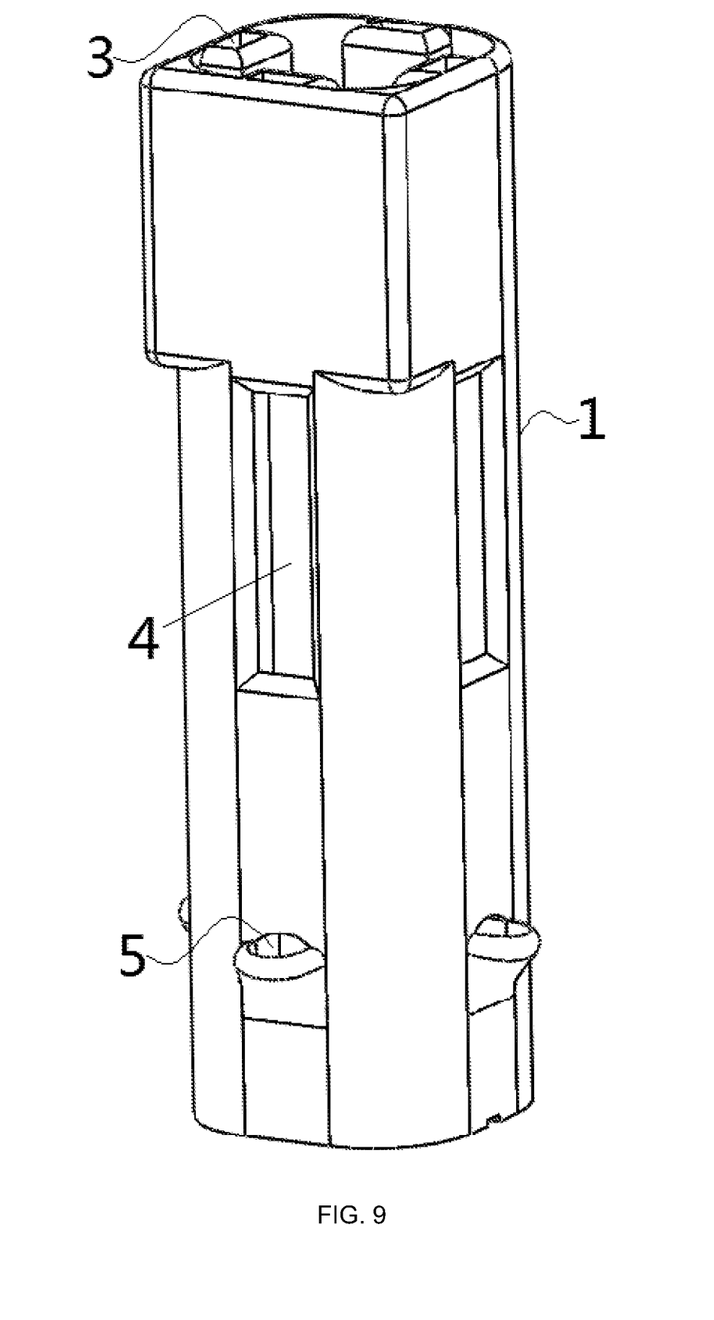
FIG. 9 is a perspective view of a sample rotating rack according to a still another embodiment of the present application.
Figure 10:
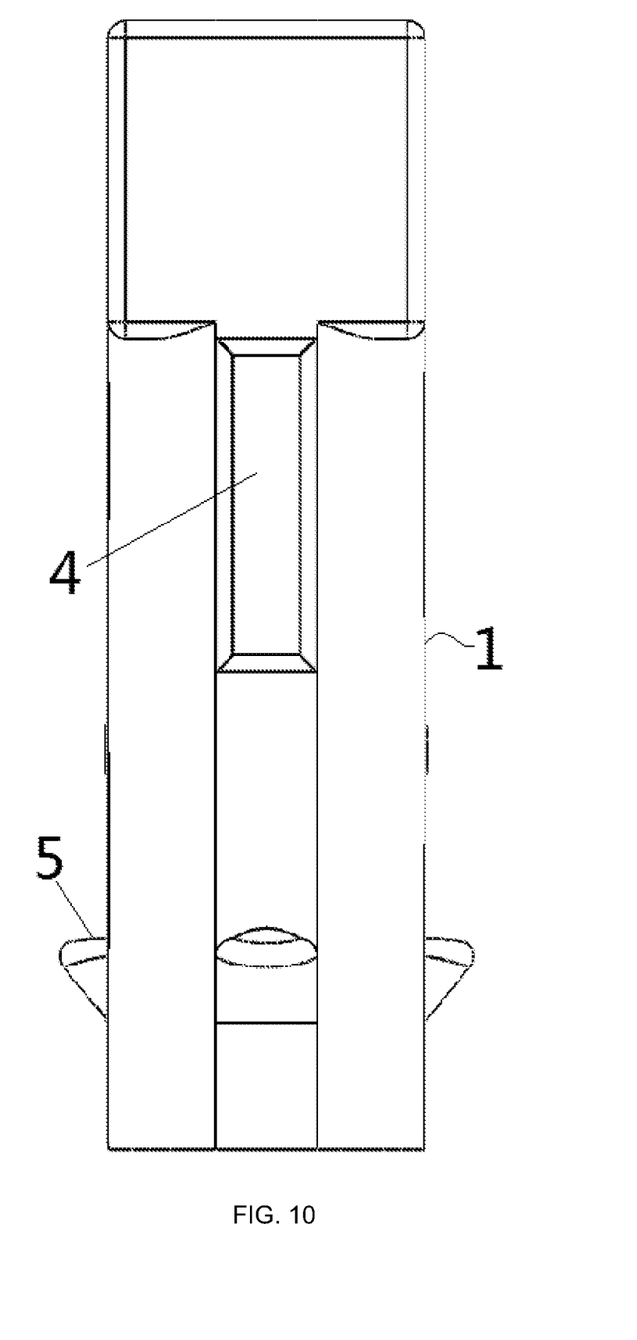
FIG. 10 is a front view of the sample rotating rack according to the still another embodiment of the present application.
Figure 11:
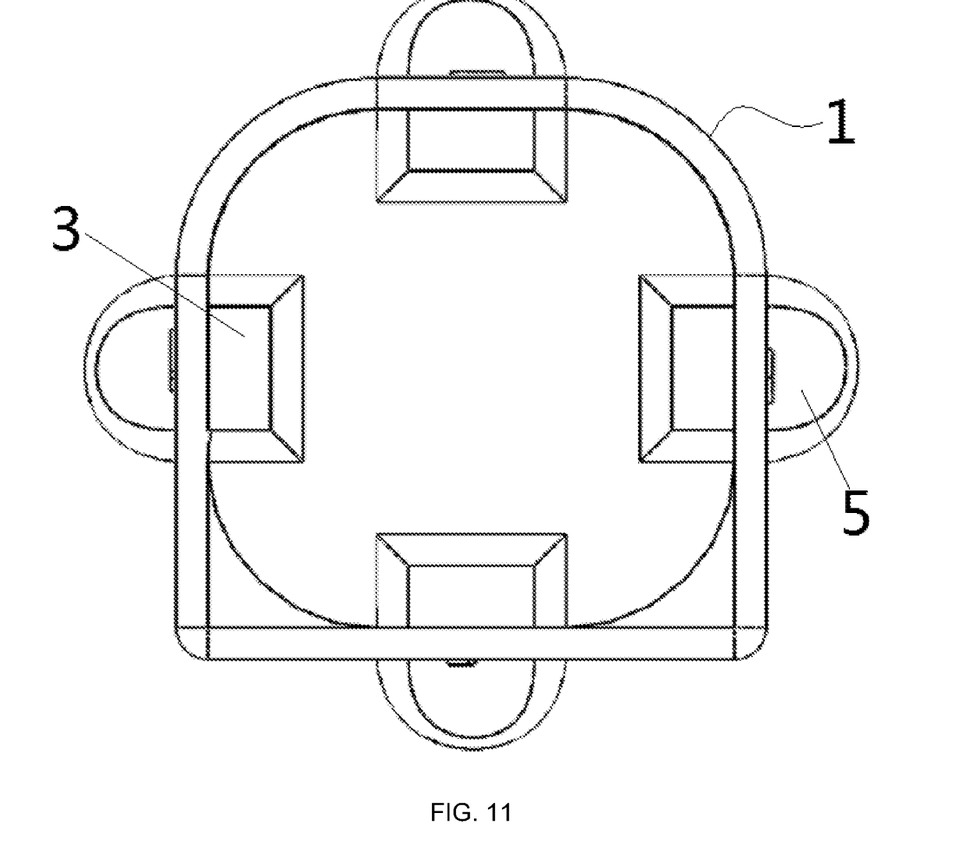
FIG. 11 is a top view of the sample rotating rack according to the still another embodiment of the present application.

FIG. 9 is a perspective view of a sample rotating rack according to a still another embodiment of the present application; FIG. 10 is a front view of the sample rotating rack according to the still another embodiment of the present application; and FIG. 11 is a top view of the sample rotating rack according to the still another embodiment of the present application. As shown in FIGS. 9 to 11, in the still another optional embodiment of the present application, the plural sample carriers distributed around the circumference of the rotating body 1 are tube cavities 3 provided in a side wall of the rotating body 1, and the plurality of sample carriers are uniformly provided and spaced apart around the circumference of the rotating body 1. Similar to the tube cavity 3 in the embodiment shown in FIGS. 3 to 5, in the embodiment shown in FIG. 9, a length direction of the tube cavity 3 is parallel to the axial direction of the rotating body 1, and a side wall of each tube cavity 3 apart from the axle center of the rotating body 1 is provided with an observation window 4. Unlike the tube cavity 3 in the embodiment shown in FIGS. 3 to 5, in the present embodiment, all the tube cavities 3 are not communicated with each other. In the structure, the tube cavity 3 is configured to bear an immunochromatographic test paper strip, and incident light rays and scattered light rays respectively irradiate the observation window 4 and return. When the individual tube cavities 3 are independent from and not in communication with each other, the test paper strip in any tube cavity 3 is used for testing one independent sample. Features of a plurality of samples may be tested simultaneously during rotation of the rotating body 1.

As shown in FIGS. 9 to 11, further, in order to facilitate filling of the solution sample, a filling port 5 is provided in the side wall of each tube cavity 3. Since different solution samples are tested respectively, which requires plural filling operations, the filling port 5 is independently provided in the side wall of each tube cavity 3, such that the solution sample to be tested is placed from an outer side of the tube cavity 3. Specifically, an outer side wall of the tube cavity 3 is provided with a filling structure, the filling structure is convexly disposed on the side wall of the tube cavity 3, the filling structure is internally provided with a passage communicated with the tube cavity 3, the filling port 5 is provided at the filling structure and communicated with the passage of the filling structure, and the filling port is arranged as facing towards the axial direction of the rotating body 1.

On the basis of any one of the embodiments shown in FIGS. 3 to 11, the plurality of sample carriers may be evenly distributed around the circumference of the rotating body 1. Since the sample carriers are distributed evenly, every time the rotating body 1 is driven by the rotating table 8 to rotate by a fixed angle, the next sample may be rotated to a test position, which facilitates more accurate location. Test paper in the next tube cavity 3 may be irradiated every time the rotating body is rotated by a specific angle.

The sample rotating rack of the Raman spectrum detector shown in FIGS. 1 and 2 is the sample rotating rack shown in FIGS. 3 to 5, and it should be understood that in other optional embodiments of the present application, the sample rotating rack employed in the Raman spectrum detector may be any one of the sample rotating racks shown in FIGS. 6 to 11.

With continued reference to FIGS. 1 and 2, the Raman spectrum detector may further include a reset device 9. The reset device 9 is provided on the rotating table 8. In the structure, the reset device 9 may set that each test process starts with one particular tube cavity 3, which is particularly useful when not all tube cavities 3 are used, saves time and improves test efficiency. Specifically, the reset device 9 may be a sensor for detecting whether the rotating table 8 is located at a preset position, and when it is detected that the rotating table 8 is located at the preset position, a starting point of the test may be determined accordingly.

On the basis of the above-mentioned embodiments, the Raman spectrum detector further includes a lifting mechanism, and the sample rotating rack may be provided on the rotating table by means of the lifting mechanism. The incident light rays emitted by the Raman probe are switched between the test line (T line) and the control line (C line) of the sample rotating rack by adjusting the lifting mechanism up and down. Specifically, the lifting mechanism may include a linear motor, a cylinder, or the like. In other optional embodiments of the present application, the lifting mechanism may also drive the rotating table to ascend and descend.

On the basis of the above-mentioned embodiments, a translation mechanism is further provided, the sample rotating rack may be provided on the rotating table by means of the translation mechanism, and the translation mechanism is able to change a distance between the sample rotating rack and the Raman probe. A laser focal length of the incident light rays emitted by the Raman probe onto the sample rotating rack may be adjusted by adjusting the translation mechanism to change the distance between the sample rotating rack and the Raman probe. Similarly, the translation mechanism may also be a linear motor, a cylinder, or the like, and the translation mechanism may also drive the whole rotating table and the lifting mechanism to translate.

Optionally, the lifting mechanism and the translation mechanism may be combined to be set as one device to perform unified control on a spatial position of the sample rotating rack. As shown in FIG. 1, a two-dimensional manual translation table 12 may be provided below the sample rotating rack to adjust spatial positions of the rotating table 8 and the entire sample rotating rack. In the present application, the two-dimensional manual translation table has translation and lifting functions at the same time. By manually adjusting the knob, the sample rotating rack may be driven by the two-dimensional manual translation table to move up and down, such that the incident light rays emitted by the Raman probe 10 may be switched between the test line (T line) and the control line (C line) of the sample rotating rack. Similarly, by manually adjusting the knob, the sample rotating rack may also be driven to move back and forth by the two-dimensional manual translation table.

Further, the Raman spectrum detector may further include a display screen electrically connected to the spectrum analyzer 7. In the structure, the display screen may output an analysis result of the spectrum analyzer 7 by means of a chart, such that a user may conveniently and directly read all reaction data of the sample solution. Specifically, in order to facilitate user operations, the display screen may be a touch screen for receiving an instruction from the user.

As shown in FIG. 10, the Raman spectrum detector may further include a rechargeable battery electrically connected to the laser 6 and the spectrum analyzer 7. In the structure, in order to prevent experimental failure caused by a sudden power interruption, and to conveniently use an apparatus in an environment where a power source is not easily connected, the rechargeable battery plays an important role.

The technical solution of the sample rotating rack and the Raman spectrum detector described above may well improve the problems of the large size, the complex structure, the numerous operation steps, the low test efficiency, or the like, of the Raman spectrum detector in the prior art. With the sample rotating rack according to the present application, as many as sample carriers may be compactly arranged in a relatively small space, optical irradiation may be quickly conducted on the plurality of samples by rotating the rotating body 1, and the sample rotating rack has a simple structure and a low cost. With the Raman spectrum detector according to the present application, optical analysis and test may be quickly conducted on the plurality of samples using the laser 6, the spectrum analyzer 7, the rotating table 8 and the above-mentioned sample rotating rack, an automation degree is high, and the test efficiency is high.

Finally, it should be noted that the above embodiments are only used to illustrate the technical solutions of the present application, not to limit the present application; although the present application is described in detail with reference to the above embodiments, those having ordinary skill in the art should understand that they still can modify technical solutions recited in the aforesaid embodiments or equivalently replace partial or all technical features therein; these modifications or substitutions do not make essence of corresponding technical solutions depart from the scope of technical solutions of embodiments of the present application.

In addition, it should be understood by those skilled in the art that although some embodiments as discussed above comprise some features comprised in other embodiments rather than other features, combinations of features in different embodiments mean that the combinations are within the scope of the present application and form different embodiments. For example, in the appended claims, any one of the embodiments for which the protection is sought can be used in any combination manner. In addition, the information disclosed in this Background Art section is only for enhancement of understanding of the general background art of the present application and should not be taken as an acknowledgement or any form of suggestion that this information forms the prior art already known to a person skilled in the art.

INDUSTRIAL APPLICABILITY

The sample rotating rack and the Raman spectrum detector provided with the same according to the present application have compact and simple structures, and may simplify an operation process of testing plural samples, and improve the efficiency of testing plural samples.

What is claimed is:
1. A sample rotating rack, comprising a rotating body and a plurality of sample carriers provided thereon, the plurality of sample carriers being distributed around a circumference of the rotating body and being configured to be able to be irradiated by light rays located at a periphery of the rotating body, wherein a magnetic ring is provided on the circumference of the rotating body.

2. The sample rotating rack according to claim 1, wherein the sample carriers are each a ring sleeve, and the plurality of ring sleeves are arranged around the circumference of the rotating body and configured to allow test tubes to be inserted therein to fix the test tubes.

3. The sample rotating rack according to claim 2, wherein the plurality of sample carriers are evenly distributed around the circumference of the rotating body.

4. The sample rotating rack according to claim 1, wherein the rotating body is cylindrical, the plurality of sample carriers is a plurality of tube cavities provided in a side wall of the rotating body, and the plurality of sample carriers is arranged around the circumference of the rotating body; a length direction of each of the plurality of tube cavities is parallel to an axial direction of the rotating body; a side wall of each of the plurality of tube cavities apart from an axle center of the rotating body is provided with an observation window; and
individual tube cavities of the plurality of tube cavities communicate with each other, at bottom.

5. The sample rotating rack according to claim 4, wherein the tube cavities extend from an end surface of one end of the rotating body to the other end of the rotating body.

6. The sample rotating rack according to claim 5, wherein a side wall of each tube cavity is provided with a filling port communicated with the tube cavity.

7. The sample rotating rack according to claim 6, wherein an outer side wall of the tube cavity is provided with a filling structure, the filling structure is convexly disposed on the outer side wall of the tube cavity, the filling structure is internally provided with a passage communicated with the tube cavity, and the filling port is provided in the filling structure and communicated with the passage of the filling structure.

8. The sample rotating rack according to claim 7, wherein the filling port is arranged as facing towards the axial direction of the rotating body.

9. The sample rotating rack according to claim 4, wherein the rotating body is provided with an injection passage in communication with each tube cavity, and the injection passage has an injection port in an end surface of the rotating body.

10. The sample rotating rack according to claim 9, wherein the injection passage is located at a middle axis line of the rotating body and extends along the middle axis line of the rotating body.

11. The sample rotating rack according to claim 1, wherein the rotating body is cylindrical, the sample carriers are tube cavities provided in a side wall of the rotating body, and the plurality of sample carriers are arranged around the circumference of the rotating body; a length direction of each of the tube cavities is parallel to an axial direction of the rotating body; a side wall of each tube cavity apart from an axle center of the rotating body is provided with an observation window; and
all the tube cavities are not in communication with each other.

12. The sample rotating rack according to claim 1, wherein the plurality of sample carriers are evenly distributed around the circumference of the rotating body.

13. A Raman spectrum detector, comprising a laser, a spectrum analyzer, a Raman probe, a rotating table and the sample rotating rack according to claim 1, the sample rotating rack being arranged on the rotating table, the Raman probe being arranged at a periphery of the sample rotating rack, and the Raman probe being electrically connected to the laser and the spectrum analyzer respectively; and
the laser being configured to emit excitation light to the sample rotating rack through the Raman probe, and the Raman probe being configured to be able to receive Raman scattered light of the sample rotating rack and return the Raman scattered light to the spectrum analyzer.

14. The Raman spectrum detector according to claim 13, further comprising a reset device, the reset device being provided on the rotating table.

15. The Raman spectrum detector according to claim 13, further comprising a lifting mechanism, the sample rotating rack being provided on the rotating table by means of the lifting mechanism.

16. The Raman spectrum detector according to claim 15, wherein the lifting mechanism comprises a cylinder or a linear motor.

17. The Raman spectrum detector according to claim 13, further comprising a display screen electrically connected to the spectrum analyzer.

18. The Raman spectrum detector according to claim 13, further comprising a translation mechanism, the sample rotating rack being provided on the rotating table through the translation mechanism, and the translation mechanism being configured to be able to change a distance between the sample rotating rack and the Raman probe.

19. The Raman spectrum detector according to claim 18, wherein the translation mechanism comprises a cylinder or a linear motor.

20. The Raman spectrum detector according to claim 13, further comprising a rechargeable battery electrically connected to the laser and the spectrum analyzer.

* * * * *